UNITED STATES PATENT OFFICE.

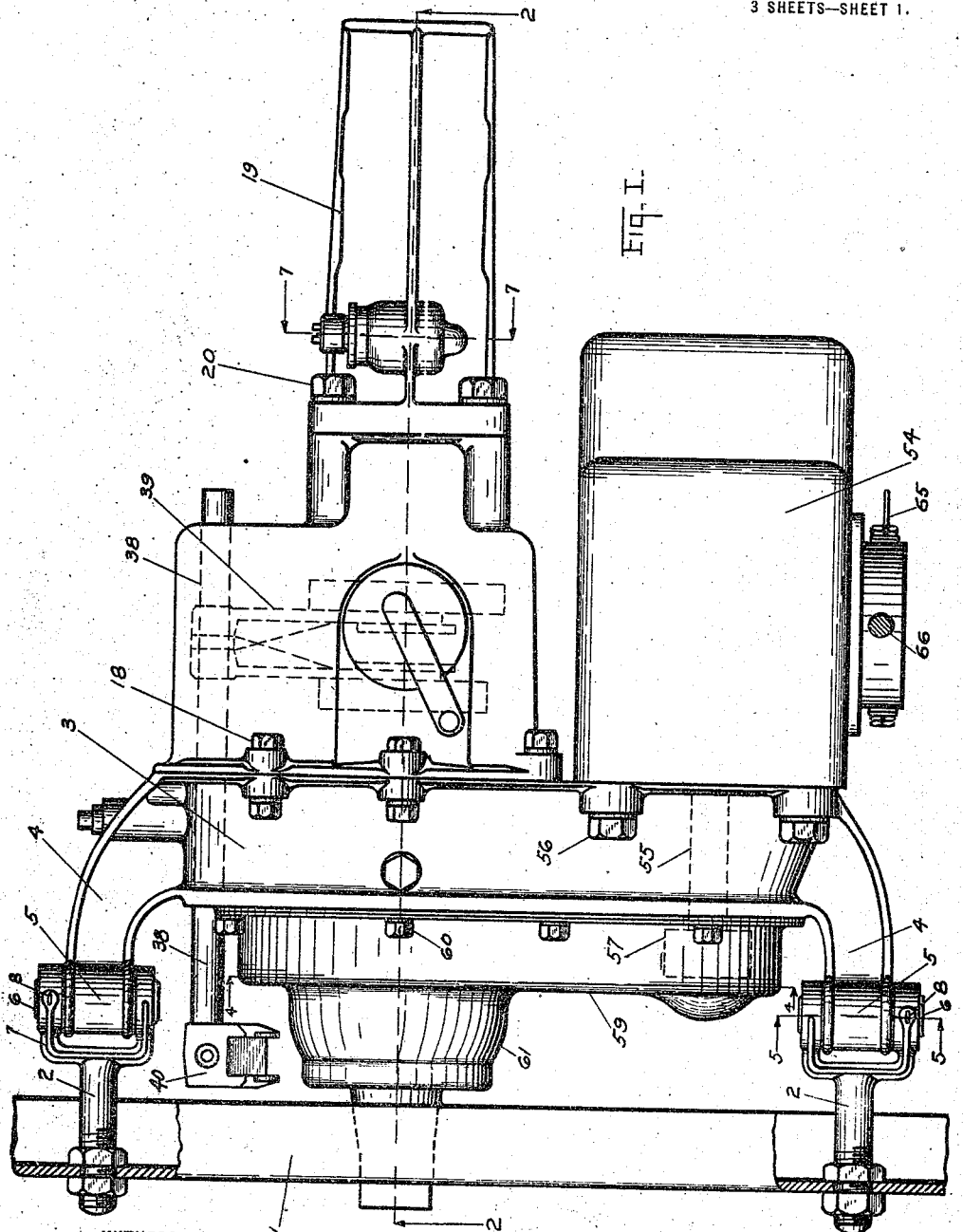

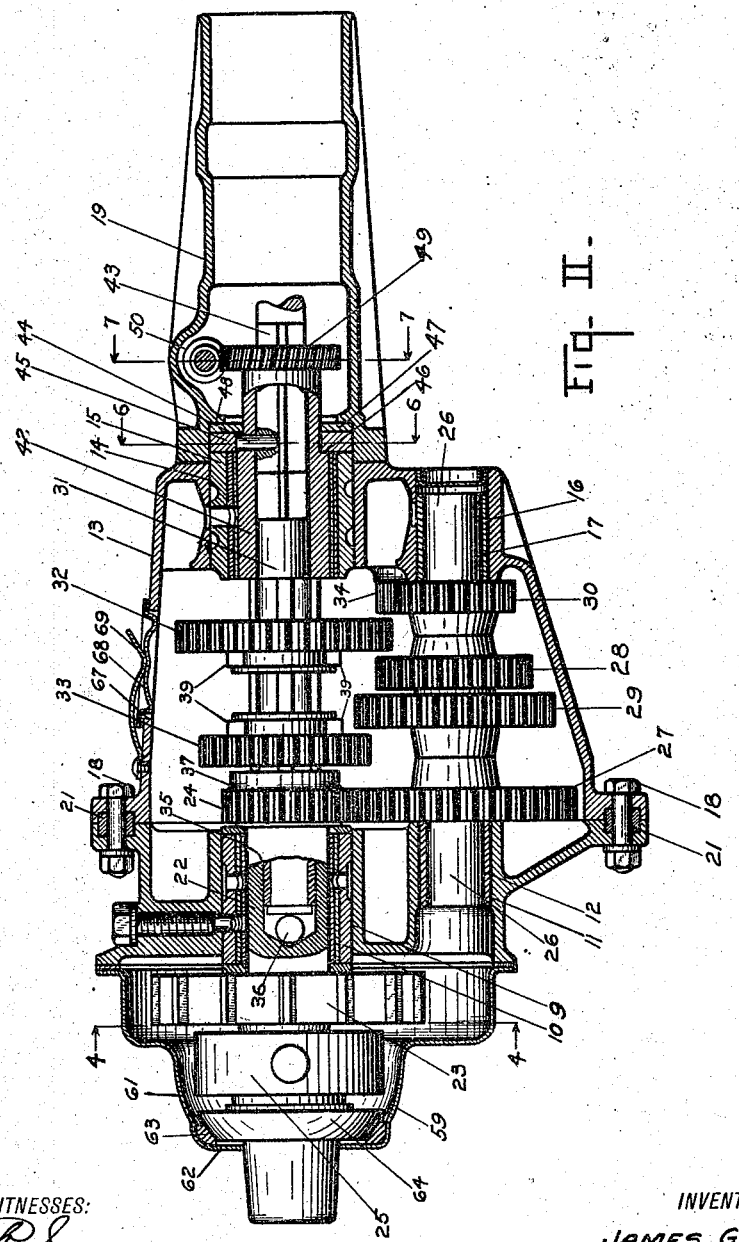

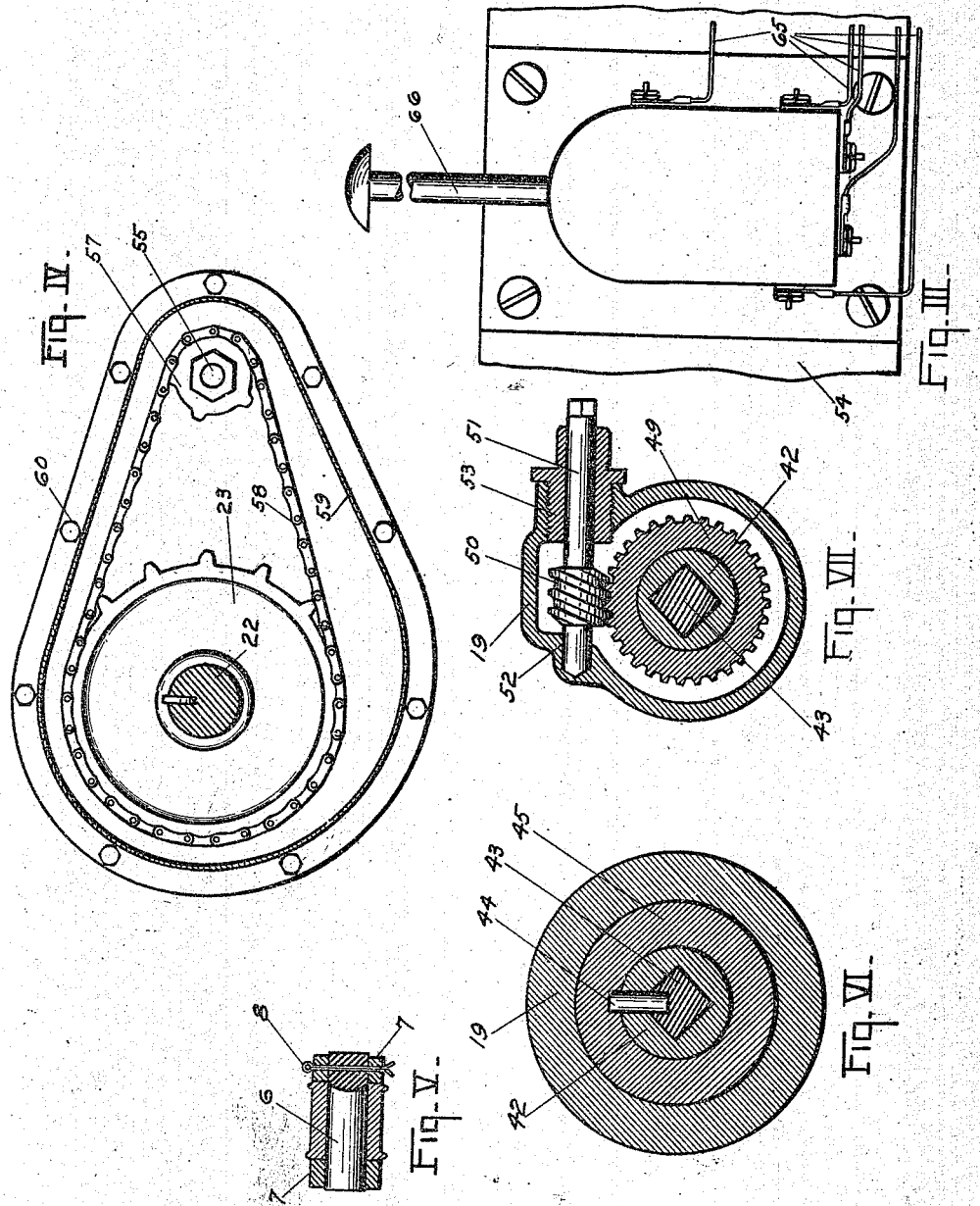

JAMES GUTHRIE, OF JACKSON, MICHIGAN, ASSIGNOR TO BRISCOE MOTOR CO., INC., OF JACKSON, MICHIGAN.

TRANSMISSION MECHANISM.

1,178,916.  Specification of Letters Patent.  Patented Apr. 11, 1916.

Application filed August 6, 1915. Serial No. 44,093.

*To all whom it may concern:*

Be it known that I, JAMES GUTHRIE, a citizen of the United States, residing at Jackson, county of Jackson, State of Michigan, have invented certain new and useful Improvements in Transmission Mechanisms, of which the following is a specification.

This invention relates to improvements in transmission mechanisms.

The main objects of this invention are: First, to provide in a motor vehicle an improved transmission mechanism and starting motor mounting. Second, to provide in a motor vehicle an improved driving connection for the starting motor. Third, to provide in a motor vehicle an improved transmission gear casing and mounting which may be readily assembled in the vehicle and conveniently disassembled to afford access to the parts contained therein. Fourth, to provide a structure of the class described, which is simple and compact in structure and also simple and economical in its parts. Fifth, to provide in a transmission mechanism for motor vehicles an improved speedometer driving connection.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a plan view of a structure embodying the features of my invention, only a cross member of the chassis being shown. Fig. II is a vertical longitudinal section on a line corresponding to line 2—2 of Fig. I. Fig. III is a detail side view of the starting motor and generator. Fig. IV is a transverse vertical section on a line corresponding to line 4—4 of Figs. I and II, showing the driving connections for the starting motor. Fig. V is a detail section on a line corresponding to line 5—5 of Fig. I. Fig. VI is an enlarged detail section on a line corresponding to line 6—6 of Fig. II, showing details of the connections for the propeller shaft to the driven shaft of the transmission mechanism. Fig. VII is a transverse section on a line corresponding to line 7—7 of Fig. II, showing details of the speedometer driving connections.

In the drawing similar reference characters refer to similar parts throughout the several views, and the sectional views are taken looking in the direction of the little arrows at the ends of the section lines.

Referring to the drawings, 1 represents a cross member of a chassis. On this cross member are hangers 2 for the yoke-like support member 3. The support member 3 is provided with arms 4 at its ends terminating in bearings 5 to receive the pins 6 carried by the hangers 2 which are forked at 7 to receive the pins. The pins are retained by the cotters 8.

The support member 3 is provided with a bearing 9 having a bushing therein and with a bearing 11 having a bushing 12. On the rear side of the support 3 I mount a gear box or casing 13 having a bearing 14 provided with a bushing 15 and a bearing 16 provided with a bushing 17. The bearing 14 is alined with the bearing 9 of the support, while the bearing 16 is alined with the bearing 11 of the support.

The gear casing is removably secured to the support by means of the bolts 18, the support and casing being suitably flanged to receive these bolts. On the rear end of the gear casing I mount the propeller shaft housing member 19, the same being secured to the gear casing by the bolts 20. This propeller shaft housing member is adapted to receive the front end of the propeller shaft tube, which is not shown in the drawing.

The joint between the gear casing and the support member is preferably provided with a gasket 21 (see Fig. II). The driving member 22 is arranged in the bearing 9 and provided with a starting gear 23 at its front end and a transmission gear 24 at its rear end.

The engine or power shaft (not shown) is connected to the driving member 22 through the universal joint, designated generally by the numeral 25, which is alined with the pivots 6 of the support member. As the structural details of this joint form no part of my present invention I do not describe the same herein.

The side or driving transmission shaft 26 is disposed with one end in the bearing 11 of the support member and the other in the alined bearing 16 of the gear casing. On this shaft 26 is a gear 27 meshing with the gear 24 on the driving member and selective gears 28, 29 and 30.

The driven transmission shaft 31 has gears 32 and 33 splined thereon to be shifted into mesh with the gears 28 and 29, the gear 32 being also adapted to be shifted into the reverse gear 34. The shaft 31 is disposed with its front end in the bearing 35 in the driving member which is provided with a thrust ball 36 (see Fig. II). The driven transmission shaft 31 and the driving member may be connected by the clutch 37, one member of which is on the gear 33 and the other on the gear 24, a common jaw clutch being indicated. This clutch is engaged and the gears 32 and 33 shifted by means of the shifting rod 38 supported at one side of the transmission shaft for longitudinal movement and provided with arms 39 engaging the gears. The shifting rod 38 is provided with a lever connection 40, the shifting lever, however, not being illustrated.

On the rear end of the transmission shaft 31 is a coupling sleeve 42 for the propeller shaft 43, the sleeve being arranged in the bearing 15. This sleeve is squared or otherwise shaped internally to receive the similarly shaped ends of the propeller and the driving transmission shafts which are arranged in the sleeve to abut, as shown in Fig. II. The propeller shaft is secured against longitudinal movement in the coupling by means of the pin 44 (see Figs. II and VI). This pin is arranged through the sleeve and retained by the ring 45 which embraces the coupling sleeve and fits against the shoulder 46 thereon. A washer 47 is arranged on the outside of the ring and is supported by the shoulder 48 in the propeller shaft housing member 19 so that when this housing member is bolted to the gear casing the parts are retained in their assembled relation but when released they may be readily disassembled. The bearings in the casing and support member are so shaped as to facilitate their lubrication.

On the rear end of the coupling sleeve 42 is a worm gear 49 meshing with the worm 50 on the speedometer driving spindle 51 which is adapted to receive a suitable flexible shaft (not illustrated). The inner end of the spindle shaft 51 is supported in a bearing 52 while its outer end is supported in a bearing 53 threaded into the propeller shaft housing member 19. This provides a simple and direct connection for the speedometer to the transmission mechanism.

At one side of the gear casing I mount a starting motor comprising a suitable casing 54 and driving shaft 55. The motor casing is secured to the support member 3 by the bolts 56. The driving shaft 55 of the motor is disposed through the support member 3 and provided with a sprocket gear 57 connected to the gear 23 on the driving member 22 by the sprocket chain 58. These parts are inclosed by the housing or casing member 59 secured to the front side of the support member 3 by the bolts 60. The housing member 59 is provided with an extension 61 for the joint 25 provided with an inturned flange 62 supporting a packing 63 for the closure member 64 on the joint. The closure member is spherically curved to coact with the gasket or packing ring 63. The motor is preferably of the type adapted also as a generator and has suitable connections 65 with the storage battery (not illustrated). The motor is controlled by the rod 66.

With the parts thus arranged they are conveniently and easily assembled. In assembling the parts the driving member is first mounted in the bearing therefor in the support. The front ends of the transmission shaft with the gears thereon are then introduced into the bearings provided therefor in the support and driving member and the casing slipped over the same and secured. With the propeller shaft housing member 19 loosened and slipped back on the propeller shaft tube the propeller shaft is introduced into the coupling sleeve, the retaining pin 44 engaged therewith and the sleeve and washers 46 and 47 slipped to place. The propeller shaft housing member 19 is then adjusted to position and secured by the bolts 20. The casing or housing member 19 can be assembled upon the gear casing either before or after the adjustment of the gear casing 13. The casing 13 is provided with an opening 67 having a closure 68 retained by the spring 69 for introducing lubrication and the like. By this arrangement of parts the starting motor is suitably mounted and supported in proper relation to the transmission mechanism. The parts are simple and compact and may be very readily assembled or disassembled.

I have not attempted to illustrate or describe various modifications which I contemplate and which might be desirable to adapt my improvements for particular embodiments, as I believe the disclosure made will enable those skilled in the art to which my invention relates to embody or adapt the same as may be desired. I desire, however, to be understood as claiming my improvements specifically in the form illustrated as well as broadly within the scope of the appended claims.

Having thus described my invention, what I claim as new and desire to secure by Letters Patent, is:

1. The combination with a frame member provided with hangers, of a support member constituting a casing member and having supporting arms at its ends pivotally mounted on said hangers, bearings in said support, a gear casing mounted on the rear side of said support member and having bearings at its outer end alined with the said bearings of said support member, a driving member disposed in one of said bearings of said support member and having a starting gear on its front end and a transmission gear on its rear end, said driving member being adapted to receive the end of a transmission shaft, driving means for said driving member comprising a universal joint disposed in front of said starting gear and alined with the pivots of said support member, a transmission mechanism comprising a driving transmission shaft disposed in alined bearings in said support member and gear casing and provided with a gear meshing with the gear on said driving member, a driven transmission shaft disposed with its front end in said driving member and provided with a clutch connection thereto and with a propeller shaft coupling sleeve on its rear end disposed in a bearing in said gear casing, said transmission shafts being provided with coacting selective gears, a propeller shaft disposed in said coupling sleeve to abut said driven transmission shaft, a thrust ball for the front end of said driven transmission shaft, a propeller shaft housing member mounted on the rear end of said gear casing, a motor comprising a casing mounted on said support at the side of said gear casing and a driving shaft disposed through said support member, a gear on said motor driving shaft, a connecting belt for said gear on said motor shaft to said starting gear on said driving member, and a casing member mounted on the front side of said support member to embrace said motor driving connections and said universal joint.

2. The combination with a frame member provided with hangers, of a support member constituting a casing member and having supporting arms at its ends pivotally mounted on said hangers, bearings in said support, a gear casing mounted on the rear side of said support member and having bearings at its outer end alined with the said bearings of said support member, a driving member disposed in one of said bearings of said support member and having a starting gear on its front end and a transmission gear on its rear end, said driving member being adapted to receive the end of a transmission shaft, driving means for said driving member comprising a universal joint disposed in front of said starting gear and alined with the pivots of said support member, a transmission mechanism comprising a driving transmission shaft disposed in alined bearings in said support member and gear casing and provided with a gear meshing with the gear on said driving member, a driven transmission shaft disposed with its front end in said driving member and provided with a clutch connection thereto and with a propeller shaft coupling sleeve on its rear end disposed in a bearing in said gear casing, said transmission shafts being provided with coacting selective gears, a propeller shaft disposed in said coupling sleeve, a propeller shaft housing member mounted on the rear end of said gear casing, a motor comprising a casing mounted on said support at the side of said gear casing and a driving shaft disposed through said support member, a gear on said motor driving shaft, a connecting belt for said gear on said motor shaft to said starting gear on said driving member, and a casing member mounted on the front side of said support member to embrace said motor driving connections and said universal joint.

3. The combination with a frame member provided with hangers, of a support member constituting a casing member and having supporting arms at its ends pivotally mounted on said hangers, bearings in said support, a gear casing mounted on the rear side of said support member and having bearings at its outer end alined with the said bearings of said support member, a driving member disposed in one of said bearings of said support member and having a starting gear on its front end and a transmission gear on its rear end, said driving member being adapted to receive the end of a transmission shaft, driving means for said driving member comprising a universal joint disposed in front of said starting gear and alined with the pivots of said support member, a transmission mechanism comprising a driving transmission shaft disposed in alined bearings in said support member and gear casing and provided with a gear meshing with the gear on said driving member, a driven transmission shaft disposed with its front end in said driving member and provided with a clutch connection thereto, a motor comprising a casing mounted on said support at the side of said gear casing and a driving shaft disposed through said support member, a gear on said motor driving shaft, a connecting belt for said gear on said motor shaft to said starting gear on said driving member, and a casing member mounted on the front side of said support member to embrace said motor driving connections and said universal joint.

4. The combination with a frame member provided with hangers, of a support member constituting a casing member and having supporting arms at its ends pivotally mounted on said hangers, bearings in said support, a gear casing mounted on the rear side of said support member and having bearings at its outer end alined with the said bearings of said support member, a driving member disposed in one of said bearings of said support member and having a transmission gear on its rear end, said driving member being adapted to receive the end of a transmission shaft, driving means for said driving member comprising a universal joint alined with the pivots of said support member, a transmission mechanism comprising a driving transmission shaft disposed in alined bearings in said support member and gear casing and provided with a gear meshing with the gear on said driving member, a driven transmission shaft disposed with its front end in said driving member and provided with a clutch connection thereto and with a propeller shaft coupling sleeve on its rear end disposed in a bearing in said gear casing, said transmission shafts being provided with coacting selective gears, a propeller shaft disposed in said coupling sleeve to abut said driven transmission shaft, a thrust ball for the front end of said driven transmission shaft, a propeller shaft housing member mounted on said gear casing and having driving connections with said driving member.

5. The combination with a frame member provided with hangers, of a support member constituting a casing member and having supporting arms at its ends pivotally mounted on said hangers, bearings in said support, a gear casing mounted on the rear side of said support member and having bearings at its outer end alined with the said bearings of said support member, a driving member disposed in one of said bearings of said support member and having a starting gear on its front end and a transmission gear on its rear end, said driving member being adapted to receive the end of a transmission shaft, driving means for said driving member comprising a universal joint disposed in front of said starting gear and alined with the pivots of said support member, a transmission mechanism comprising a driving transmission shaft disposed in alined bearings in said support member and gear casing and provided with a gear meshing with the gear on said driving member, a driven transmission shaft disposed with its front end in said driving member and provided with a clutch connection thereto, and a motor comprising a casing mounted on said support at the side of said gear casing and having driving connections with said driving member.

6. The combination of a support constituting a casing member, a pivot for said support, a gear casing mounted on one side of said support, said support and said casing being provided with alined transmission shaft bearings, a driving member disposed in one of the bearings of said support member and having a starting gear on its front end, driving means for said driving member comprising a universal joint disposed in front of said starting gear and alined with the pivot of said support member, a transmission mechanism comprising shafts disposed in bearings in said support member and gear casing and provided with coacting gears, one of said transmission shafts being provided with a clutch connection to said driving member, a motor mounted on said support at the side of said gear casing and having a driving shaft disposed through said support member, a gear on said motor driving shaft, a connecting belt for said gear on said motor shaft to said starting gear on said driving member, and a casing member mounted on the front side of said support member to embrace said motor driving connections and said universal joint.

7. The combination of a support constituting a casing member, a pivot for said support, a gear casing mounted on one side of said support, said support and said casing being provided with alined transmission shaft bearings, a driving member disposed in one of the bearings of said support member, driving means for said driving member comprising a universal joint disposed in alinement with the pivot of said support member, a transmission mechanism comprising shafts disposed in bearings in said support member and gear casing and provided with coacting gears, a motor mounted on said support at the side of said gear casing and having driving connections with said driving member, and a casing member mounted on the front side of said support member to embrace said motor driving connections and said universal joint.

8. The combination of a pivotally mounted support, a transmission mechanism comprising a casing mounted on one side of said support and a driving member mounted on said support member and having a starting gear in front of said support, a starting motor and generator mounted on said support at the side of said gear casing and having a driving shaft disposed through said support member, a gear on said motor driving shaft, a connecting belt for said gear on said motor shaft to said starting gear on said driving member, and a casing member mounted on said support member to inclose said motor driving connections.

9. The combination of a pivotally mounted support, a transmission mechanism comprising a casing mounted on one side of said support and a driving member mounted on said support member and having a starting gear in front of said support, a starting motor and generator mounted on said support at the side of said gear casing and having a driving shaft disposed through said support member, a gear on said motor driving shaft, and a connecting belt for said gear on said motor shaft to said starting gear on said driving member.

10. The combination of a pivotally mounted support, a transmission mechanism comprising a casing mounted on one side of said support and a driving member mounted on said support member, a starting motor and generator mounted on said support at the side of said gear casing and a driving shaft disposed through said support member, driving connections for said motor shaft to said driving member, and a casing member mounted on said support member to inclose said motor driving connections.

11. The combination of a pivotally mounted support, a transmission mechanism comprising a casing mounted on said support, a driving member, a starting motor mounted on said support, and driving connections for said motor to said driving member.

12. The combination of a pivotally mounted support member, a gear casing mounted on the rear side of said support member, said support and casing having alined bearings, a driving member disposed in one of the bearings of said support member and having a transmission gear on its rear end, said driving member being adapted to receive the end of a transmission shaft, driving means for said driving member comprising a universal joint disposed in alinement with the pivot of said support member, a transmission mechanism comprising a driving transmission shaft disposed in alined bearings in said support member and gear casing and provided with a gear meshing with said gear on said driving member, a driven transmission shaft disposed with its front end in said driving member and provided with a clutch connection thereto and with a propeller shaft coupling sleeve on its rear end disposed in a bearing in said gear casing, said sleeve being externally shouldered, said transmission shafts being provided with coacting selective gears, a propeller shaft disposed in said coupling sleeve to abut said driven transmission shaft, a thrust ball for the front end of said driven transmission shaft, a pin arranged through said sleeve to engage said propeller shaft, a ring arranged on said sleeve against its shoulder to embrace said pin, and a propeller shaft housing member mounted on the rear end of said gear casing and internally shouldered to receive said ring.

13. The combination of a support member, a pivot for said support, a gear casing mounted on the rear side of said support member, said support and casing having alined bearings, a driving member disposed in one of the bearings of said support member and having a transmission gear on its rear end, said driving member being adapted to receive the end of a transmission shaft, driving means for said driving member comprising a universal joint disposed in alinement with the pivot of said support member, a transmission mechanism comprising a driving transmission shaft disposed in alined bearings in said support member and gear casing and provided with a gear meshing with said gear on said driving member, and a driven transmission shaft disposed with its front end in said driving member and provided with a clutch connection thereto, said transmission shafts being provided with coacting selective gears.

14. The combination of a support member, a pivot for said support, a gear casing mounted on the rear side of said support member, said support and casing having alined bearings, a driving member disposed in one of the bearings of said support member and having a transmission gear on its rear end, said driving member being adapted to receive the end of a transmission shaft, driving means for said driving member comprising a universal joint disposed in alinement with the pivot of said support member, a transmission mechanism comprising a driving transmission shaft disposed in alined bearings in said support member and gear casing and provided with a gear meshing with said gear on said driving member, a driven transmission shaft disposed with its front end in said driving member and provided with a clutch connection thereto and with a propeller shaft coupling at its rear end, said transmission shafts being provided with coacting selecting gears, a propeller shaft, and a propeller shaft housing member mounted on the rear end of said gear casing.

15. The combination of a pivotally mounted support, bearings in said support, a gear casing mounted on the rear side of said support member and having bearings at its outer end alined with the said bearings of said support member, a transmission mechanism comprising shafts disposed in alined bearings in said support member and gear casing and provided with coacting gears, one of said shafts being provided with a propeller shaft coupling sleeve on its rear end disposed in a bearing in said gear casing, said sleeve being externally shouldered, a propeller shaft disposed in said coupling sleeve, a locking pin arranged through said sleeve to engage said propeller shaft, a ring arranged on said sleeve against its shoulder to embrace said pin, and a propeller shaft housing member mounted on the rear end of said gear casing member and internally shouldered to receive said ring.

16. The combination of a pivotally mounted support, a gear casing mounted on said support member, said support and casing being provided with transmission shaft bearings, a transmission mechanism comprising a shaft provided with a propeller shaft coupling sleeve on its rear end disposed in a bearing in said gear casing, said sleeve being externally shouldered, a propeller shaft disposed in said coupling sleeve, a locking pin arranged through said sleeve to engage said propeller shaft, a ring arranged on said sleeve against its shoulder to embrace said pin, and a propeller shaft housing member mounted on the rear end of said gear casing.

17. The combination of a support, a gear casing mounted on said support member, said support and casing being provided with transmission shaft bearings, a transmission mechanism comprising shafts disposed in bearings in said support member and gear casing and provided with coacting gears, a propeller shaft, a propeller shaft housing member mounted on the outer end of said gear casing, driving means for said transmission mechanism comprising a universal joint disposed in alinement with the pivots of said support, and a casing member mounted on said support to inclose said universal joint.

18. The combination of a pivotally mounted support, a gear casing mounted on said support member, said support and casing being provided with transmission shaft bearings, a transmission mechanism comprising shafts disposed in bearings in said support member and gear casing and provided with coacting gears, a propeller shaft, and a propeller shaft housing member mounted on the outer end of said gear casing.

19. The combination with a propeller shaft, of a transmission mechanism comprising a shaft alined with said propeller shaft, a coupling sleeve for said shafts, a worm gear on said coupling sleeve, a propeller shaft housing member embracing said worm gear, and a speedometer driving spindle mounted on said housing member and provided with a worm coacting with said gear.

20. The combination with a propeller shaft of a transmission mechanism comprising a shaft alined with said propeller shaft, a coupling sleeve for said shafts, a worm gear on said coupling sleeve, and a speedometer driving spindle provided with a worm coacting with said gear.

In witness whereof, I have hereunto set my hand and seal in the presence of two witnesses:

JAMES GUTHRIE. [L. S.]

Witnesses:
FRED. MACHLIN,
A. T. SEARLES.